United States Patent [19]

Gould

[11] 4,425,087

[45] Jan. 10, 1984

[54] PRESSURE EQUALIZING DEVICE AND DEEP WELL MOTOR/PUMP COMBINATION

[75] Inventor: Deryk S. M. Gould, Edinburgh, Scotland

[73] Assignee: Northern Engineering Industries, England

[21] Appl. No.: 325,571

[22] Filed: Nov. 27, 1981

[30] Foreign Application Priority Data

Dec. 11, 1980 [GB] United Kingdom ............... 8039708

[51] Int. Cl.³ .................. F04B 35/04; H02K 5/12
[52] U.S. Cl. ................................. 417/414; 310/87
[58] Field of Search ............... 417/414, 421, 422, 424; 310/87

[56] References Cited

U.S. PATENT DOCUMENTS

| | | | |
|---|---|---|---|
| 1,363,315 | 12/1920 | Dron | 417/414 |
| 2,032,000 | 2/1936 | Brown et al. | 417/414 |
| 2,381,834 | 8/1945 | Meredew et al. | 417/424 |
| 2,740,059 | 3/1956 | Conery | 310/87 |
| 2,876,370 | 3/1959 | Pleuger et al. | 310/87 |
| 4,040,773 | 8/1977 | Tuzson | 310/87 |

Primary Examiner—William L. Freeh
Assistant Examiner—Paul F. Neils

[57] ABSTRACT

In a fluid-filled electric motor having a throughgoing shaft the requirements (i) internal fluid pressure maintained above ambient during installation (ii) equalization of internal and ambient pressures at run-up (iii) no solid particles contaminate internal fluid are met by a pressurizing apparatus in which internal motor pressure above ambient moves a piston against a spring. The pressure ensures integrity of a seal and pressure and temperature variations are accommodated by piston movement. The seal runs clear of the motor shaft allowing equalization of internal and ambient pressures during run up to speed. Only liquid can enter the spring chamber.

4 Claims, 2 Drawing Figures

PRESSURE EQUALIZING DEVICE AND DEEP WELL MOTOR/PUMP COMBINATION

BACKGROUND OF THE INVENTION

The invention relates to a device for use with fluid-filled machines required to run in arduous conditions, such as a fluid-filled motor driving a downhole pump in an oil-well, for example.

In such a machine, the following requirements are required to be met:

(i) the fluid pressure inside the machine to be kept above ambient pressure irrespective of any change in pressure or temperature before and during installation;

(ii) the internal and ambient pressures to be equalized when the shaft of the machine is initially run up to speed after installation;
and (iii) no deleterious particles to contaminate the internal fluid.

BRIEF SUMMARY OF THE INVENTION

Those requirements are met according to the invention by the provision of pressurizing apparatus in which the requirement (i) is met by the provision of a piston in a cylinder (connected to the machine) movable against a spring. The greater internal fluid pressure ensures the integrity of a seal between the piston and the cylinder. Variations in the pressure or temperature of the ambient conditions are accommodated by piston movement, the internal pressure always being higher than ambient.

The requirement (ii) is met by the provision of seal means which, as the machine runs up to speed, allows internal fluid to escape so as to equalize internal and ambient pressures.

The requirement (iii) is met by the provision of filter means which prevent ingress of any solid deleterious particles into the spring chamber as the piston moves to accommodate pressure or temperature changes.

BRIEF DESCRIPTION OF THE DRAWING

One form of combination will now be described by way of example with reference to the accompanying drawings in which.

DETAILED DESCRIPTION OF THE PREFERRED EMBODIMENT

Figure 1:
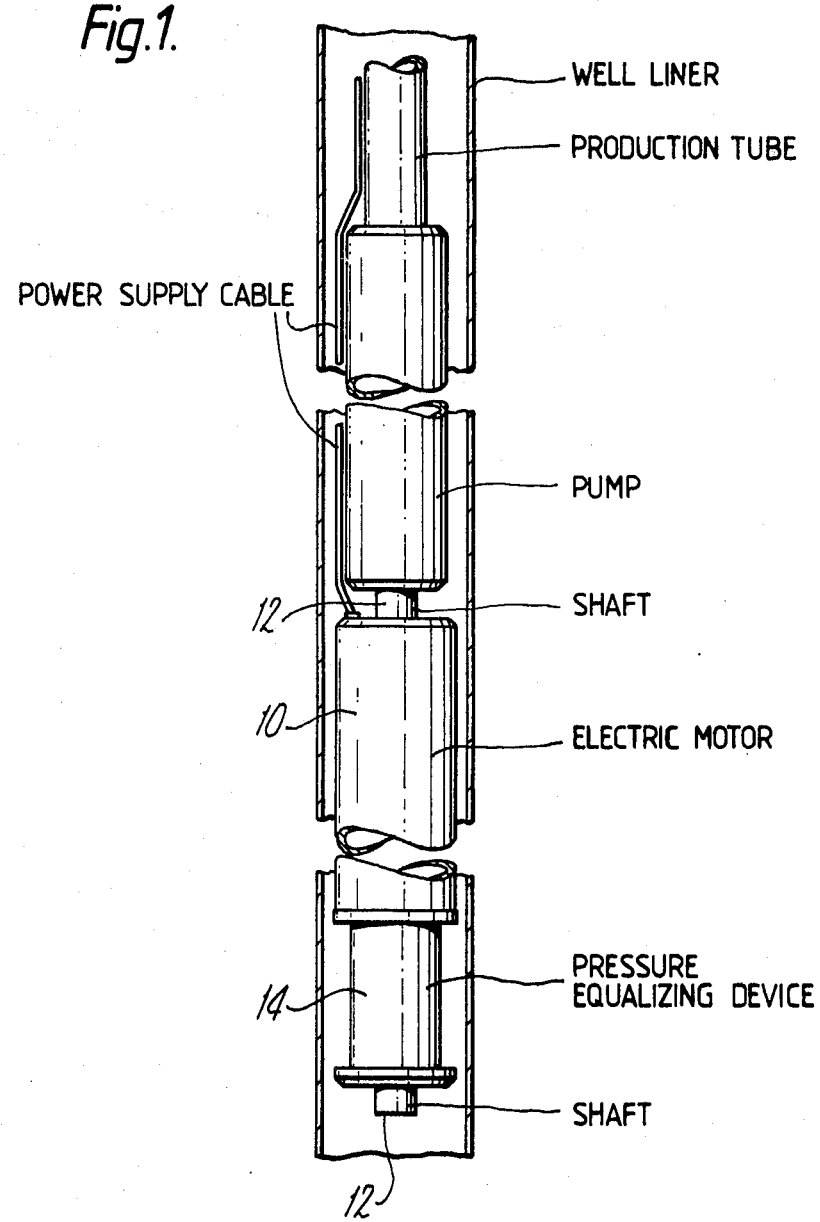
FIG. 1 is a schematic vertical section through the combination in a deep subterranean borehole such as an oil well, for example.
Figure 2:
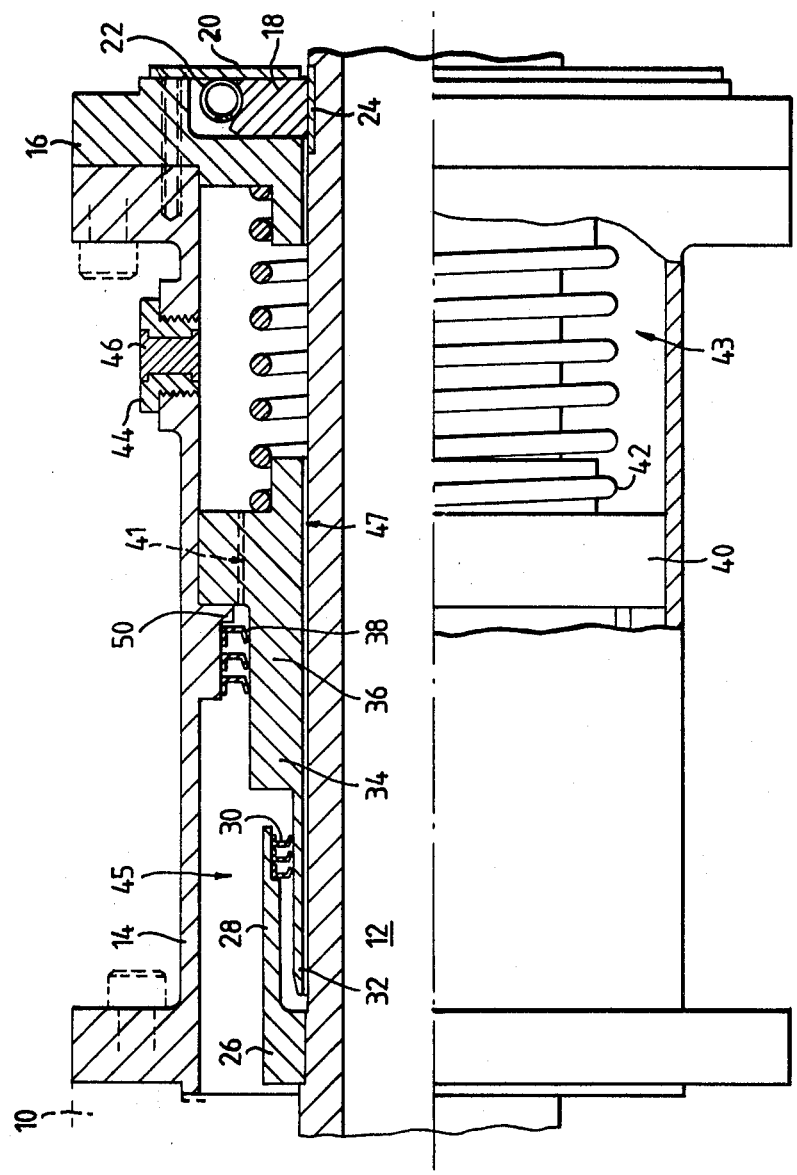
FIG. 2 is a schematic longitudinal section through the pressure equalizing device forming part of the combination shown in FIG. 1.

The drawings show part of a downhole pump equipment for operation in a borehole of an oil-well. Usually, the equipment will operate as shown in FIG. 1 within a tubular lining within the borehole, beneath the lower end of the production tube. The pump motor, which typically for example is an electric induction motor, includes a hollow housing, part of which is shown at 10, and a motor shaft part of which is shown at 12, which is arranged for rotation relative to the housing 10. The apparatus shown in the drawings includes a cylindrical case 14 connected at one end to the motor housing 10 and at the other end to an annular end plate 16, both connections being fluid-tight. The plate 16 has a central circular recess outside the case 14 in which an annular ceramic or tungsten carbide seal 18 is located. The seal 18 is a face seal and is encircled by a continuous coiled spring garter 22 which urges the seal 18 to the left against the plate 16 and which is a running fit around an annular layer 24 of tungsten carbide carried by the shaft 12. A clearance of some two thousandths of an inch exists between the seal 18 and the layer 24.

The shaft 12 extends right through the case 14 and out through the plate 16 and the right-hand end of the shaft 12 (not shown) is beyond a sealed motor control switch unit (not shown) through which the shaft 12 also extends.

The shaft 12 carries an annular collar 26 fixed to the shaft. The collar 26 includes an annular shroud 28 spaced away from the shaft 12 and having an internal end recess in which a series of three annular lip seals 30 is mounted.

The seals engage and seal against the shroud 28 and the seal lips engage the outer surface of a cylindrical extension 32 of an annular piston 34 through which the shaft 12 extends. The piston 34 has a central portion 36 of enlarged diameter the outer surface of which is engaged by the lips of a series of three lip seals 38. The seals 38 are mounted in the case 14 and seal against the case. The piston 34 has an external flange 40 the periphery of which slidingly engages the inside of the case 14. A fine bore 41 extends through the flange 40.

A helical compression spring 42 is positioned between the flange 40 and the plate 16 in a spring chamber 43, the spring being located by annular spigots on those members.

The case 14 has a tapped hole in which is screwed a bush 44 defining a port containing a filter body 46.

In preparation for putting the equipment into use in a borehole, the motor housing 10 and the case 14 are filled with thin mineral oil through an aperture (not shown) and the oil is pressurised by means of a pump (not shown) and one-way valve connected to the aperture. When a predetermined pressure above ambient is reached the aperture is closed so that the oil is retained under pressure within the equipment. The pressure of the oil forces the piston 34 to the right against the spring 42 and at the predetermined pressure the piston flange 40 is positioned away from the internal annular stop 50 within the case 14, the spring force being balanced by the force on the piston 34 produced by the pressurized oil to the left of the piston.

The lips of the series of seals 30 and 38 are maintained fully effective by the oil pressure, which forces the lips into sealing engagement with the surfaces of the piston extension 32 and the piston part 36, respectively. The pressure also presses the seals into sealing engagement with their mounting surfaces on the shroud 28 and the case 14, respectively. The piston 34 with the case 14 to the left of the piston and the shaft 12 its collar 26 and the seals 30 and 38 together define a variable volume 45.

At this stage and during installation of the equipment the oil pressure within the pump motor housing 10 and within the apparatus case 14 is maintained above ambient pressure, irrespective of any change in ambient temperature or pressure. Any changes in ambient temperature or pressure are accommodated by change in the magnitude of the variable volume 45 with movement of the piston 34, the pressure of the oil always being maintained above ambient pressure.

The equipment can then be installed into the equipment group to be sent down the borehole.

During the initial stage of operation of the pump motor, the rotation of the shaft 12 and the collar 26 causes the lip of the series of seals 30 to move radially outwardly in response to centrifugal force and so to run clear of the piston extension 32. Pressurized oil now passes the seals 30 and flows between the piston 34 and the shaft 12 into the spring chamber 43. The oil pressure to the left of the piston 34 falls to ambient pressure which is now the pressure of the medium surrounding the equipment (for example crude oil or special fluid or other medium within the borehole).

The piston 34 therefore is moved leftward by the force of the spring 42 until the piston engages the stop 50.

Thus, the pressures of the internal light mineral oil in the motor housing 10 and variable volume 45 and of the external ambient medium are equalized at this stage.

Changes in ambient conditions during subsequent operation cause external medium to enter or leave the spring chamber 43 through the filter 46, so that the pressure in the chamber 43 is continuously being equalized to the ambient pressure. The apparatus is said to "breathe" when that occurs. However, no solid or abrasive particles present in the external medium contaminate the light oil within the motor housing 10 or within the case 14 to the motor side of the seals 30 and 38 because of the presence of the filter 46 and the action of the seal 18. If the ambient pressure rises above the pressure in the housing 10 and volume 45, when the piston 34 is against the stop 50 external ambient medium passes the seals 38 so as to enter the variable volume 45 so as to equalize the pressure therein and in the housing 10 to the ambient pressure. The bore 41 permits medium readily to reach the seals 38 from the spring chamber 43.

If the ambient pressure falls below the pressure in the housing 10 and the variable volume 45, the piston 34 moves to the right against the spring 42 so that the variable volume 45 increases and the pressure therein and in the housing 10 is once again equalized to the ambient pressure. A subsequent rise in ambient pressure can be equalized to the pressure in the housing 10, at least in part, by movement of the piston 34 to the left.

Thus, while the shaft 12 is stationery or while insufficient centrifugal force to lift the lips of the seals 30 is present, changes in ambient pressure are repeatedly equalized by changes in the pressure within the housing 10, either by fluid entering the variable volume 45 or by movements of the piston 34 along the case 14.

During running, the lips of the seals 30 will lift clear of the piston extension 32 and changes in ambient conditions may cause either light oil to pass the seals 30 and to flow through the clearance 47 between the piston 34 and the shaft 12 to the spring chamber 43 or to cause ambient filtered medium to pass from the spring chamber 43 past the seals 30 to reach the variable volume 45. However, this is without detriment to the running of the motor or the operation of the apparatus shown in the drawing.

In operating position in a borehole, the pump the motor and the apparatus shown are arranged coaxially and the shaft is upright as shown in FIG. 1 or inclined to a degree depending on the orientation of the borehole. The pump is uppermost, with the apparatus shown and the motor arranged beneath the pump. The pump draws for example crude oil through the shaft 12 and also draws oil past the outside of the motor so that the motor is subjected to a useful cooling effect. Oil is delivered from the pump into the production tube through which the oil travels to the well head.

What is claimed is:

1. A pressure equalizing device in combination with an electric motor and a pump driven by said motor for deep well operation which motor has a housing and a shaft which extends through the housing and is rotatable relatively thereto, said device comprising a cylinder which is secured to said housing, said shaft extending coaxially within said cylinder, an annular piston through which said shaft extends and which is arranged coaxially therewith in said cylinder for movement therealong to define therein with said cylinder a variable volume in communicating relationship with the interior of said housing, said variable volume containing fluid compatible with operational requirements of said motor, said cylinder having an annular end wall remote from said housing and embracing said shaft, a seal arranged between said end wall and said shaft, a chamber defined within said cylinder between said piston and said end wall, a spring in said chamber against which said piston moves when said variable volume increases, means defining a port through said cylinder establishing communication between said chamber and the exterior of said cylinder, filter means in said port, first and second lip seal means which are arranged respectively between said cylinder and said piston and between said piston and said shaft, and which at least in the absence of rotation of said shaft resist flow of said fluid from said variable volume to said chamber to maintain said fluid pressurized above ambient pressure under an applied load imposed by said piston and said spring, said second lip seal means being rotatable with said shaft in sealed relationship therewith and including annular lip means which is engageable with said piston, said lip means being displaceable away from said piston by centrifugal force in response to rotation of said shaft to permit equalization of pressure between said variable volume and said chamber whereby ambient pressure is directly communicated to said motor housing.

2. A combination according to claim 1, in which said first lip seal means is carried by said cylinder in sealed relationship therewith and includes lip means engageable with said piston, both said lip means being directed towards said variable volume whereby pressure therein acts on said lip means in respective senses forcing said lip means against said piston.

3. A combination according to claim 2, in which said shaft carries an annular shroud in sealed relationship therewith encircling said shaft and in which said piston includes a cylindrical extension which extends between said shroud and said shaft, said second lip seal means being mounted on said shroud in sealed relationship therewith with the lip means thereof slidably engaging said extension of said piston, and in which said piston has a central aperture the diameter of which is greater than the external diameter of the shaft where it passes through said piston, and in which said piston has a first circumferential surface portion slidably engaging said cylinder within said chamber and has a second circumferential surface portion of diameter intermediate that of said first circumferential surface portion and said extension, which said second circumferential surface portion is slidably engaged by said lip means of said first lip seal means, said piston having means establishing communication between the part of said chamber containing said spring and the part of said chamber bounded by said first lip seal means and said second circumferential surface portion of said piston.

4. A combination according to claim 2 or claim 3, in which said lip means of said first lip seal means is operable in the absence of rotation of said shaft to allow pressure increase in said chamber, consequent upon increased ambient pressure, to be transmitted past said first seal means to said variable volume.

* * * * *